Jan. 5, 1960 F. F. HINES 2,920,298
RESISTANCE STRAIN GAGE
Filed Feb. 16, 1956

INVENTOR.
FRANK F. HINES
BY
ATTORNEY

United States Patent Office 2,920,298
Patented Jan. 5, 1960

2,920,298
RESISTANCE STRAIN GAGE

Frank F. Hines, Arlington, Mass., assignor to Baldwin-Lima-Hamilton Corporation, a corporation of Pennsylvania Application February 16, 1956, Serial No. 565,843

8 Claims. (Cl. 338—3)

This invention relates to gages for the measurement of characteristics such, for example, as strain, movement, etc. and is of the type employing a filament whose electrical resistance changes in response to strain of the filament.

It has long been known that in many measuring instruments the response to an applied condition to be measured varies with the temperature at which the condition is applied. In some cases such variation may correspond to an increase in response with increase of temperature whereas in others there may be a decrease in response with increase of temperature. The instrument designer would like to be able to predetermine the relationship of response vs. temperature at which the condition is applied. In the field of electrical resistance strain gage measurements the response of such a strain gage to a given strain (such as $\frac{1}{1000}$ per inch of length) applied to it normally varies with temperature and it is common to say "its gage factor varies with temperature." Also, if a resistance type strain gage is mounted upon an elastic load responsive member (such as a cantilever beam or a column made of steel, for example) the response of the strain gage to a load or force applied to the member will in general vary with the temperature of the member as a result of variation of the modulus of elasticity of the member with temperature, and this effect may or may not be combined with the aforementioned gage factor variation with temperature. These two temperature-dependent phenomena are independent of any change in resistance of the strain gage resulting from the thermal coefficient of electrical resistance of the strain sensitive element or elements of which it is comprised. It has heretofore been considered that the desired predetermination of relationship of response versus temperature in the resistance strain gage measurement field had to be dealt with as a condition outside the capabilities of the present art gage element, and accordingly it has been the practice to apply a temperature-sensitive resistor as a measuring bridge correction by inserting the resistor in the power supply circuit of the bridge. This had serious limitations which have been endured for many years.

In my present invention I provide novel means to extend the capabilities of the resistance element strain gage so that the gage itself can be made to predetermine the relationship referred to above and hence I do not have to limit my correcting means to the circuitry external of the gage itself. This means that I have not only effected a simplification in the application of the gage to many problems of measurement but also that I can handle cases where a plurality of gages are involved in a single measurement, the temperatures differing among them and each gage will automatically perform the desired predetermining function independent of the others.

As one specific illustration of the application of my invention there has ever been present the difficulty that in nearly all elastic materials the rigidity (or Young's modulus of elasticity, for example) varies with temperature to an appreciable extent. For instance, it is well known in the weighing scale art that precise weighing cannot result from a "spring" scale unless great pains are taken to minimize or correct for this effect. In the field of "strain gage" weighing it is necessary to deal in reality with a spring scale and the strain gage measures the strain of the "spring" in response to the applied load. It is in the compensation against the modulus change with temperature in such field that my invention finds an important specific application which it is convenient to employ in explaining its theory and operation.

It is an object of my invention to provide an improved gage of the resistance filament type whose response to an applied strain can be made to vary in accordance with a predetermined relationship to the temperature to which the gage is subjected when the strain is applied thereto, whereby a variety of compensating or correcting functions may be fulfilled.

A more specific object of my invention is to provide a modulus compensated gage of the resistance filament type and thereby eliminate the necessity for bridge correcting means such as have heretofore been required.

Another object is to provide a relatively simple, economical highly effective modulus compensated gage that will accurately and faithfully respond to applied loads to a specimen notwithstanding rapidly changing temperature and temperature gradients.

A further object is to provide an improved resistance filament type gage that is self-compensated for both temperature coefficient of resistance and for changes in modulus.

Other objects and advantages will be more apparent to those skilled in the art from the following description of the accompanying drawings in which:

Fig. 5 illustrates my modulus compensated gage separated into parallel connected components while

The modulus of elasticity (Young's modulus) of practically all materials changes with changes in temperature. For the commonly used metals, such as steel and anluminum, the change in elastic modulus is in the vicinity of 2% per 100° F. change in temperature, the modulus decreasing for an increase in temperature. There are certain notable exceptions to this rule, such as Elinvar and Ni-Span-C which are especially compounded to have a relative constant modulus of elasticity with temperature. Several alloys show an increase in modulus with increase of temperature. Such alloys are sometimes used separately or in combination in instruments in order to obtain instrument sensitivities that are independent of temperature.

Figure 1:
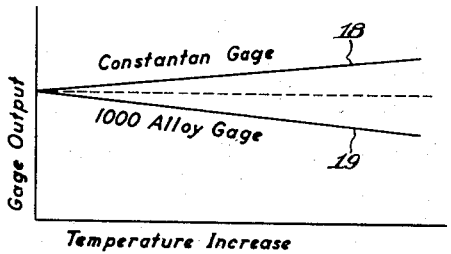
Fig. 1 is a diagram illustrating the principle of my improved modulus compensated gage.

The "gage factor," or strain sensitivity, of many wires that are suitable for use in bonded and unbonded wire strain gages is also a function of temperature with different alloys having different temperature effects. For instance, constantan wire has a relatively constant strain sensitivity over the normal operating range, whereas Jelliff Alloy "1000" wire, manufactured by The C.O. Jelliff Mfg. Corp., of Southport, Conn., has a strain sensitivity that decreases with increasing temperature by the amount of approximately 2½ to 3 percent per 100 degrees F. Other examples of alloy wires having a strain sensitivity that decreases with increasing temperature are Kanthal DR, manufactured by the Kanthal Corporation, Stamford, Conn.; Iso-Elastic, manufactured by John Chatillon & Sons, New York, N.Y.; and #479 Platinum Alloy, manufactured by Sigmund Cohn Corp., Mt. Vernon, New York. Thus a strain gage made of constantan wire will measure approximately the true strain independent of temperature but if cemented to a specimen that is subjected to constant loading conditions will show an increase in response with an increase in temperature because of the change in modulus of the specimen material. As opposed to this the "1000" Alloy gage will show a decrease in response with increasing temperature because its strain sensitivity decreases more than the decrease in modulus of elasticity of the specimen material as a result of a given temperature increase. This is demonstrated graphically in Fig. 1. The curves of Fig. 1 are produced by cementing the gage 1, having an electrical output in response to applied strain, to a load member such, for example, as a metal bending beam 2 loaded by a weight 3. The gage output is then determined by applying and removing the weight 3 at different temperatures which results in the temperature-output curves of Fig. 1. If gage 1 is a resistance wire strain gage made of constantan wire the output curve 18 is obtained and if made of "1000" Alloy wire the ouput curve 19 is obtained.

Figure 2:
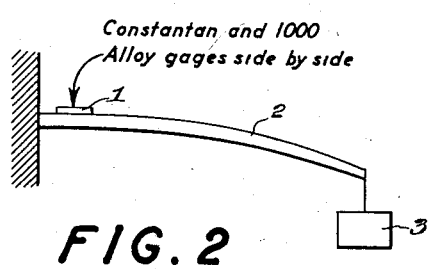
Fig. 2 is a diagrammatic illustration of a loading device for establishing the value of the curves in Fig. 1.

It is important here to draw a distinction between strain due to the coefficient of thermal expansion of a member such as 2 in Fig. 2 and a strain due to an applied load 3 which is conveniently thought of as being applied at a given temperature. The two phenomena are entirely unrelated but easily confused, since the same strain gage 1, Fig. 2, actually "sees" them both. The earlier type of compensated strain gage, as in Ruge Patent No. 2,-350,972, can be made insensitive to the thermal expansion strain of beam 2, but that would not prevent its having a response to applied load such as the upper curve of Fig. 1 if the gage is made of constantan wire. My present invention is concerned with this latter strain phenomenon as distinguished from the expansion strains associated with temperature change. Where I refer to an "applied" strain, or to applied stress I means a strain or stress such as that resulting from a load or force applied to a structure.

Figure 3:
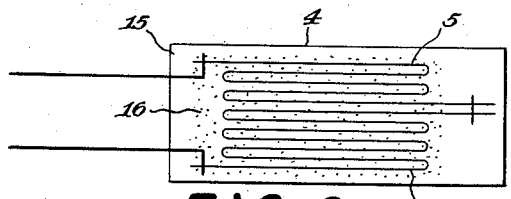
Fig. 3 is a diagrammatic illustration of a modulus compensated strain gage.

By including in a strain gage 4, Fig. 3, a combination of materials such as constantan wire 5 and "1000" Alloy wire 6, a strain gage can be so constructed that, by choosing a suitable proportion of constantan to "1000" Alloy wire, it has a change in strain sensitivity versus temperature of any predetermined value between the two extremes provided by the characteristics of each of the wires alone. By choosing the proper proportion between the two wires a strain gage can be constructed that has a sensitivity change versus temperature that is equal to the change in modulus with temperature of a given material of which the specimen is formed and to which the gage is bonded, or attached. Such a modulus compensated strain gage will therefore measure the stress or the applied load independent of the temperature of the member. A modulus compensated strain gage is particularly useful where the gage is to be used not for the measurement of strain itself but where the output is to be used as an indication of pressure, load, torque, or some other applied physical phenomenon.

The construction of a modulus compensated gage is not limited to the two alloys mentioned. However, constantan wire is particularly effective as it has a strain sensitivity that is sensibly constant over the range of minus 50 to plus 300 degrees F. and "1000" Alloy wire has a strain sensitivity that decreases over this temperature range. Other alloys also show more or less change in strain sensitivity with temperature.

Figure 4:
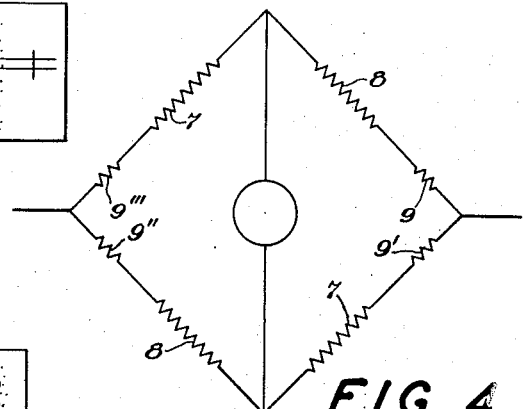
Fig. 4 is a bridge illustrating how modulus compensation can be used, if desired, for only certain of the individual strain gages incorporated in the bridge arms.

Most measuring devices utilizing strain gages, such as load and pressure cells, utilize four strain gages that are connected in the form of a Wheatstone bridge. To make the output of such a bridge in response to an applied condition independent of temperature it is not necessary to make each individual strain gage modulus compensated. For example, modulus compensation of the bridge can be performed by constructing two gages 7 of one wire and two gages 8 of another wire, connecting them into a bridge as shown in Fig. 4, and adding trimming resistors 9, 9', 9'', 9''' to obtain the desired result. Gages 7 and 8 would be made of strain-sensitive materials such that their electrical responses to an applied strain are variable by different amounts for a given variation of temperature of the member or members to which they are attached. Preferably, the strains applied to gages 7 and 8 are opposite in algebraic sign; for example, in a cantilever beam subject to bending, gages 7 and 8 are preferably mounted on opposite sides so that one is subjected to tension strain while the other undergoes compression when a load is applied to the beam. In the case of a column subject to axial load, gage 7 may be axially extending while gage 8 may be transverse to the axis.

Any two adjacent bridge arms may be made up of such gages while the remaining two arms may be made up of fixed resistors or of additional active gages, as shown in Fig. 4. The trimming resistors 9, 9', etc., serve the double function of balancing the bridge and providing the means to adjust within limits the degree of modulus compensation provided by the several strain gages 7 and 8. This feature is particularly valuable where a very fine accuracy of modulus compensation is required since the trimming of resistors are external of the gages and may be adjusted after the transducer is gaged and can be tested at various operating temperatures.

Figure 5:
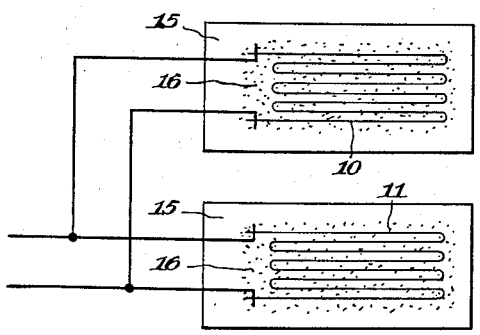
Figure 6:
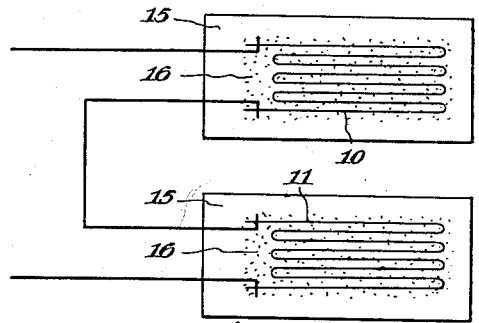
Fig. 6 illustrates such components connected in series.

The two wires need not be combined into a single strain gage but may be constructed in a form of independent strain gages 10 and 11, Figs. 5 and 6, and then connected either in parallel, Fig. 5, or in series, Fig. 6, so as to effectively perform the function of a single strain gage. In each case the relative amount of wire would be different and would be selected so as to obtain the desired result in accordance with the principles previously described. This is equally true of the embodiment shown in Fig. 3.

While I have for simplicity of explanation considered the case where it is desired to compensate for (i.e. eliminate) the effect of temperature on modulus of elasticity of a member on which an applied strain is to be measured, it is not to be assumed that the usefulness of my invention is limited to such an application. Broadly, my invention provides the means to make the overall response of a strain gage to an applied strain vary in a predetermined manner with the temperature at which the strain is applied. As an example, consider the case where we wish to measure (rather than compensate for) the variation in Young's modulus of a specimen by my improved gage. In this case, I choose to predetermine the response of my gage so that its variation with temperature at which a given strain is applied is substantially zero. Then the observations I make will yield directly the desired result; viz., the thermal coefficient of modulus for the material in question.

Figure 7:
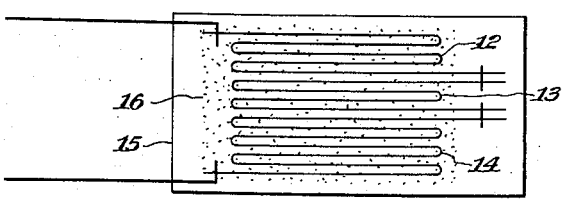
Fig. 7 illustrates a gage having combined compensation for the temperature coefficient of resistance and for changes in modulus of elasticity.

By combining the method of modulus compensation described herein with the temperature compensating method of Patent No. 2,350,922 for a self-temperature compensated gage it is possible to compensate for both the effect of temperature on zero and on modulus. By "temperature effect on zero" I mean the effect of temperature in the absence of applied strain as I have defined the term. The method of compensating the zero of a strain gage for changes in temperature is to choose two wires, one of which has a positive and the other a negative coefficient of resistance when bonded to the desired material, and combining them in the proper proportions to effect a cancellation of temperature response at zero applied strain. A wire strain gage having combined temperature and modulus compensation can be made of either two, three, or more selected wires as indicated in Fig. 7. The portion of the gage made of wire 12 has a negative sensitivity or "gage factor" temperature coefficient such as is given by "1000" Alloy. Portions 13 and 14 are made of selected constantan wires, both of which have similar temperature coefficients of sensitivity but different temperature coefficients of resistance from each other. By adjusting the proportions of the resistance of 12 to 13 plus 14 the change in modulus with temperature is compensated for. By adjusting the proportions of wires 13 to 14 it is possible to compensate for the change in zero reading of the gage versus temperature. While it is of course possible that one might be able to find two wires 5, 6 of Fig. 3 which possess the characteristics necessary to produce compensation for both zero and modulus, a more practical method is to choose wires 13 and 14 so that one has a relatively high negative and the other a relatively high positive coefficient of resistance and combining them so that they cancel the temperature coefficient of wire 12. If wire 12 happens to have either a high negative coefficient of resistance or a high positive coefficient of resistance then wires 13 and 14 might both have coefficients of resistance of the same sign but of different magnitudes, the coefficient of both being opposite to that of wire 12. Also, either of the two wires 13 or 14 could be a wire having extremely high temperature coefficient of resistance, such as nickel or copper, and thus be required in an amount small enough to have a negligible effect upon the strain sensitivity of the overall gage.

I have shown the gage wires in Figs. 3 to 7 as being of the bonded type which, as is well known, employs an insulating sheet 15, such as paper, upon which the wires are bonded throughout their effective length by any usual cement indicated by the speckled cement areas 16 although the principles of my invention are broadly applicable to unbonded resistance filament gages in certain situations.

The bonded wire type of strain gage need not be fastened directly to the member on which strain is to be measured but may be bonded to an auxiliary member as illustrated in United States Patent No. 2,316,975, Fig. 1, in which gages bonded to a U-shaped frame measure the strain or movement between points 61 and 62 of piece 66. The bonded gage may also be used to measure the movement between two separate members as illustrated in Fig. 4 of the same United States patent. The same considerations apply to the unbonded wire resistance strain gage.

Bonded wire strain gages of the combined modulus and temperature compensated type and also of the modulus compensated type only, can be useful in places where rapid temperature changes take place or where a temperature gradient exists. An individual gage compensated for the effect of temperature on both zero and modulus and a bridge formed of such individually compensated gages will show less error due to temperature changes than a strain gage or bridge whose compensation is located remotely or at some distance from the gage or gages. When measuring load, pressure, or torque in terms of strain it is nearly always desirable to have such measurements independent of temperature. Heretofore, to obtain such compensation, it has been necessary to use a temperature sensitive modulus compensating resistor which undergoes a predetermined change in resistance in response to temperature. This resistor was placed in series with the strain gage bridge power supply to obtain such compensation. The use of my modulus compensated strain gages not only achieves the same result but also allows either larger bridge output voltages or greater safety margins by eliminating the output loss due to the modulus compensating resistor presently used.

My modulus compensated strain gage goes much further than this, however, since it can fully perform the modulus compensating function in a single isolated strain gage. Or if several such gages are connected into a measuring circuit, each one will accurately perform the modulus compensation for itself, regardless of what the other gages may be doing at the time. This is of particular importance in such applications as wind tunnel sting balances where severe and often rapidly changing temperature gradients give rise to marked temperature differences at points where the several gages are connected into a single measuring circuit. The present art does not accomplish such result.

While I have throughout for simplicity referred to the "modulus compensation" of my gage, it is to be understood that the principle of my invention is not limited to modulus compensation alone. In fact, my invention is useful wherever it is necessary or desirable to make the response of a strain gage to an applied strain vary in a predetermined manner with the temperature at which the strain is applied. For example, I may deliberately choose to make the gage sensitivity to a given applied strain substantially independent of temperature so that I can use it to measure the thermal coefficient of the modulus of elasticity of various materials.

It will, of course, be understood that various changes in details of construction and arrangement of parts may be made by those skilled in the art without departing from the spirit of the invention as set forth in the appended claims.

I claim:

1. An electrical resistance strain gage adapted to be attached to a body subject to strain for measuring a strain applied to the gage from the body at a given temperature, comprising two electrical conducting elements electrically connected together and each of which has strain-sensitivity in that its electrical resistance varies in accordance with its strain, each of said elements being simultaneously subject to said applied strain which is to be measured and to the temperature of the location at which such strain is to be measured, said elements being of materials whose strain sensitivity characteristics are different from each other in that their electrical resistance responses to said applied strain are variable by different amounts upon a variation of said given temperature, the electrical resistances of said elements bearing a predetermined ratio to each other, so as to provide an overall change in electrical resistance in response to said applied strain which response varies in a predetermined manner when said given temperature is varied and which response is independent of the overall change in electrical resistance resulting from the thermal coefficients of electrical resistance of said elements.

2. The combination set forth in claim 1 further characterized in that one of said elements has, upon an increase of its temperature, a decrease in its change in electrical resistance in response to the given applied strain.

3. The combination set forth in claim 1 further characterized in that one element has, upon an increase of temperature, an increase in its change in electrical resistance in response to the given applied strain.

4. The combination set forth in claim 1 further characterized in that both of said elements are combined into a unitary structure so that when applied to a specimen whose modulus of elasticity varies with temperature at a location where the applied strain is to be measured the characteristics of said elements cause said predetermined variation of strain response with temperature to be such that the response of the gage is proportional to the product of the strain and the modulus of elasticity of the member at said location independent of the temperature.

5. An electrical resistance strain gage adapted to be applied to a specimen of material whose modulus of elasticity varies with changes in temperature comprising two electrical conducting elements each subject to the same strain which is to be measured on the specimen and to the temperature thereof at the location at which the strain is to be measured and each of which changes its electrical resistance in response to strain, one of said elements having its change in electrical resistance in response to a given applied strain variable in response to the change in modulus of the specimen material with its temperature at said location, and the electrical resistances of both of said electrical conducting elements bearing a predetermined ratio to each other, whereby for a given strain applied to the specimen an overall strain gage response is provided which varies in a predetermined manner with the temperature of the specimen so as to effect a compensating action against changes of modulus of elasticity of the specimen material which response is independent of the overall change in electrical resistance of said strain gage resulting from the thermal coefficients of electrical resistance of said elements.

6. The combination set forth in claim 5 further characterized in that said two elements are subject to strains of opposite algebraic signs when said applied strain acts and they are connected into adjacent arms of a Wheatstone bridge circuit.

7. The combination set forth in claim 5 further characterized in that said two elements are subject to strains of the same algebraic signs when said applied strain acts and they are connected into opposite arms of a Wheatstone bridge circuit.

8. The combination set forth in claim 5 further characterized in that said elements are connected into separate arms of a Wheatstone bridge circuit and at least one of said arms has a fixed trimming resistance connected in series with its element for the purpose of adjusting said overall change in electrical resistance.

References Cited in the file of this patent

UNITED STATES PATENTS 2,350,972   Ruge ----------------- June 6, 1944

OTHER REFERENCES

The Strain Gage Primer Text by C. C. Perry and H. R. Lessner, published by McGraw-Hill Company Inc., 1955, pages 62–65.